US012093883B2

(12) United States Patent
Hulugundi et al.

(10) Patent No.: US 12,093,883 B2
(45) Date of Patent: Sep. 17, 2024

(54) AUTOMATED DELIVERY COORDINATION AND MEETING SCHEDULING FOR MULTIPLE-RECIPIENT ORDERS RECEIVED AT A COMPUTER SYSTEM

(71) Applicant: International Business Machines Corporation, Armonk, NY (US)

(72) Inventors: Jagadesh Ramaswamy Hulugundi, Bangalore (IN); Raghuveer Prasad Nagar, Kota (IN); Madhu Kumar Shivalingappa, Bangalore (IN); Nalini Sampathkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 17/654,279

(22) Filed: Mar. 10, 2022

(65) Prior Publication Data
US 2023/0289713 A1    Sep. 14, 2023

(51) Int. Cl.
*G06Q 10/0836*    (2023.01)
*G06Q 30/0601*    (2023.01)

(52) U.S. Cl.
CPC ..... *G06Q 10/0836* (2013.01); *G06Q 30/0635* (2013.01); *G06Q 30/0641* (2013.01)

(58) Field of Classification Search
CPC ........... G06Q 10/0836; G06Q 30/0635; G06Q 30/0641
See application file for complete search history.

(56) References Cited

U.S. PATENT DOCUMENTS

| 8,738,470 | B2 | 5/2014 | Agarwal | |
| 9,542,597 | B2* | 1/2017 | Chung | G06Q 10/10 |
| 10,163,119 | B1 | 12/2018 | Bolton | |
| 2009/0037271 | A1* | 2/2009 | Bayne | G06Q 30/02 |
| | | | | 705/14.73 |
| 2012/0226588 | A1 | 9/2012 | Wuhrer | |
| 2013/0151357 | A1* | 6/2013 | Havas | G06Q 50/12 |
| | | | | 705/15 |

(Continued)

OTHER PUBLICATIONS

Wikipedia, "Supervised learning," www.wikipedia.org, version of article dated Mar. 1, 2021, retrieved on Apr. 18, 2024.*

(Continued)

*Primary Examiner* — Nathan Erb
(74) *Attorney, Agent, or Firm* — Heather Johnston; Andrew D. Wright; Calderon Safran & Wright, P.C

(57) ABSTRACT

Automated delivery coordination and meeting scheduling for an order including a plurality of recipients includes identifying, by a computer, an online business transaction performed by a user. The online business transaction including the order being placed by the user for the plurality of recipients. The computer determines whether the order is associated with an event that includes the plurality of recipients and, in response to the order being associated with the event, collects information corresponding to the event. The computer uses the collected information to generate a first recommendation during checkout including a synchronized delivery option for the plurality of recipients. Further, using the collected information, the computer generates a second recommendation during the checkout including a synchronized meeting scheduling option for the plurality of recipients.

17 Claims, 7 Drawing Sheets

(56) References Cited

U.S. PATENT DOCUMENTS

| | | | | |
|---|---|---|---|---|
| 2014/0280310 | A1* | 9/2014 | Gohar | G06F 16/9032 |
| | | | | 707/769 |
| 2016/0350721 | A1* | 12/2016 | Comerford | H04L 67/306 |
| 2017/0329922 | A1 | 11/2017 | Eberting | |
| 2021/0012809 | A1* | 1/2021 | Baughman | G06N 3/045 |
| 2021/0319486 | A1 | 10/2021 | Isaacson | |
| 2022/0230144 | A1* | 7/2022 | Chitrapu | G06Q 10/1093 |
| 2023/0179507 | A1* | 6/2023 | Maurice | H04W 24/06 |
| | | | | 709/224 |

OTHER PUBLICATIONS

Niksa, Matthew, "Innovation: Food Delivery; Food delivery without big fees; App-based meal delivery services are racing for dominance, but some restaurants avoid them due to cost. Enter Foodsby." Star Tribune, Minneapolis, Minnesota, Aug. 4, 2019, D .6.*

"Date Synchronization", IBM Documentation, IBM Sterling Order Management, last printed Feb. 21, 2022, 1 page, <https://www.ibm.com/docs/en/order-management?topic=shipped-date-synchronization>.

"Gift and Multiple Recipient Orders", Channergy, Jul. 19, 2010, 3 pages, <https://www.channergy.com/features/orders/gift-and-multiple-recipient-orders/>.

"Multiship", by Gist, App, Last printed Feb. 21, 2022, 6 pages, <https://apps.shopify.com/multiship>.

Disclosed Anonymously, "Method to Optimize eCommerce Order Fulfillment Using Cognitive Analysis of Social Media Data", An ip.com Prior Art Database Technical Disclosure, ip.com No. IPCOM000257664D, ip.com Electronic Publication Date: Feb. 28, 2019, 8 pages.

Mell, et al., "The NIST Definition of Cloud Computing", National Institute of Standards and Technology, Special Publication 800-145, Sep. 2011, 7 pages.

* cited by examiner

AUTOMATED DELIVERY COORDINATION AND MEETING SCHEDULING FOR MULTIPLE-RECIPIENT ORDERS RECEIVED AT A COMPUTER SYSTEM

BACKGROUND

The present invention generally relates to the field of electronic commerce, and more particularly to automatically coordinating an order delivery and meeting schedule for multiple order recipients using a computer system.

With the proliferation of online business transactions conducted over the Internet, a variety of applications can be used to support electronic commerce (e-commerce) transactions between two businesses or between a business and a customer. When placing an order to be delivered to multiple (geographically distributed) recipients as a result of a common event, traditional e-commerce shopping carts and checkout applications may present significant limitations that can result in the user unnecessarily repeating a similar shopping experience and/or performing certain activities outside the e-commerce application(s). Thus, it may be difficult for e-commerce users (businesses or individuals) to efficiently purchase and deliver the desired goods.

SUMMARY

Shortcomings of the prior art are overcome and additional advantages are provided through the provision of a computer-implemented method for delivery coordination and meeting scheduling. The method includes identifying, by a computer, an online business transaction performed by a user. The online business transaction includes the order being placed by the user for the plurality of recipients. The computer determines whether the order is associated with an event, the event including the plurality of recipients. In response to the order being associated with the event, the computer collects information corresponding to the event and based on the collected information, generates a first recommendation during checkout including a synchronized delivery option for the plurality of recipients. The computer, based on the collected information, also generates a second recommendation during the checkout including a synchronized meeting scheduling option for the plurality of recipients.

Another embodiment of the present disclosure provides a computer system for delivery coordination and meeting scheduling, based on the method described above.

Another embodiment of the present disclosure provides a computer program product for delivery coordination and meeting scheduling, based on the method described above.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention provide an artificial intelligence (AI)-based method, system, and computer program product for automatically detecting a multiple-recipient order as an event-driven order, and deriving and recommending coordinated delivery options and meeting scheduling options based on the collected details of the detected event during checkout. According to an embodiment, the multiple-recipient order is placed using one or more online business transactions programs including e-commerce platforms.

The following described exemplary embodiments provide an AI-based system, method, and computer program product to, among other things, identify a multiple-recipient order as an event-driven order, derive coordinated delivery options based on the collected details of the identified event, recommend the derived delivery options to the user during checkout (the event may be identified based on: recipients in the order, items in the order, and gift options in the order), derive meeting options based on the collected details of the identified event, recommend the scheduling of a meeting to the user during the checkout including a meeting timeslot and a meeting platform, recommend the meeting scheduling based on the derived coordinated delivery options, associate an order with a recently or newly placed order, recommend delivery options for the order to be in sync with the newly placed order, associate the order with the newly placed order (when recipients of the newly placed order are also associated with the detected event), and recommend a meeting update for the meeting scheduled for the newly placed order based on the existing order.

Thus, the present embodiments have the capacity to improve the technical field of electronic commerce by automatically identifying an order as a multiple recipient order driven by an event involving the multiple recipients, automatically providing delivery options synchronized with the event details during checkout, and automatically coordinating a meeting among the multiple recipients including recommending a meeting platform. Accordingly, the present embodiments, may facilitate and accelerate the process of simultaneous order delivery and meeting scheduling for a plurality of recipients associated with an event during e-commerce transactions.

Figure 1:
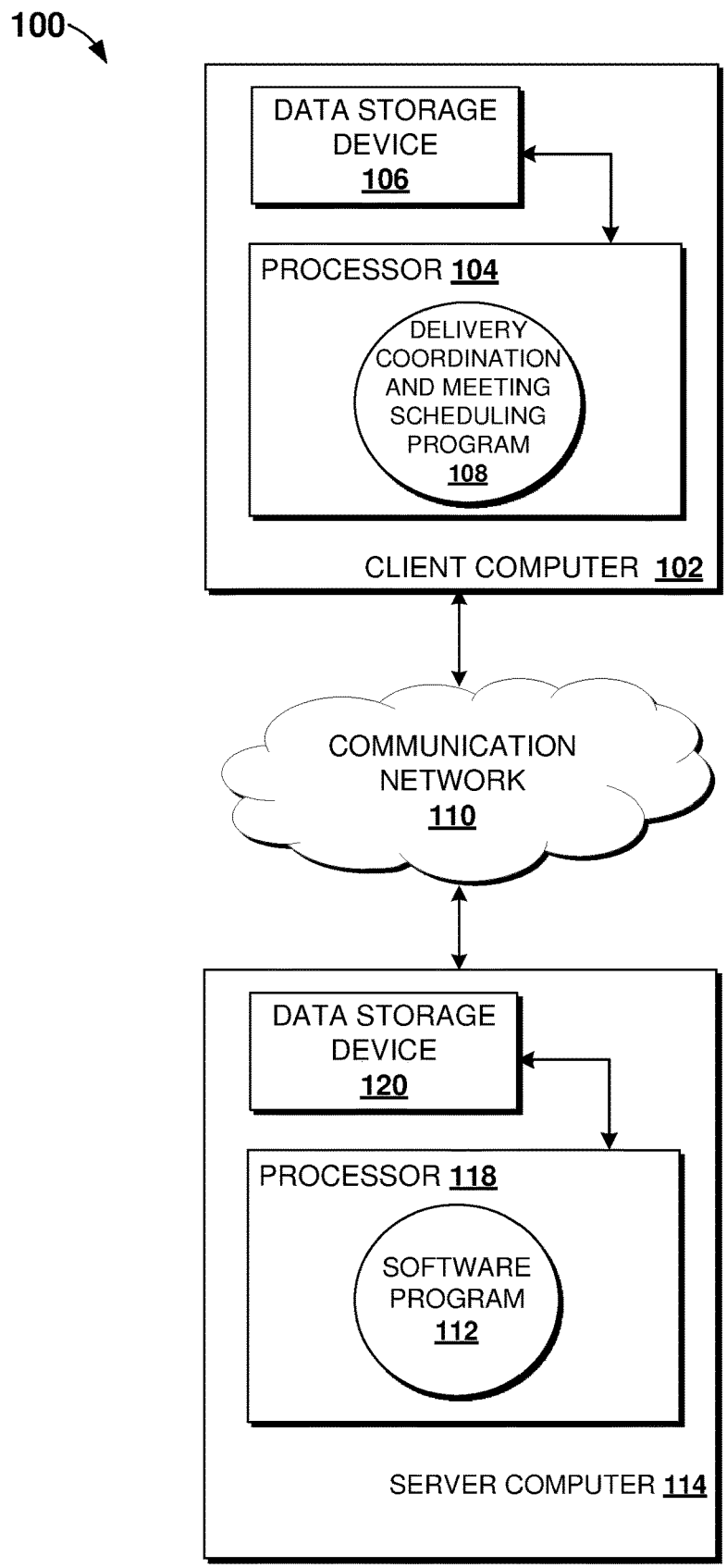
FIG. 1 is a block diagram illustrating a networked computer environment, according to an embodiment of the present disclosure.

Referring now to FIG. 1, an exemplary networked computer environment 100 is depicted, according to an embodiment of the present disclosure. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

The networked computer environment 100 may include a client computer 102 and a communication network 110. The client computer 102 may include a processor 104, that is enabled to run a delivery coordination and meeting scheduling program 108, and a data storage device 106. Client computer 102 may be, for example, a mobile device, a telephone (including smartphones), a personal digital assistant, a netbook, a laptop computer, a tablet computer, a desktop computer, or any type of computing devices capable of accessing a network.

The networked computer environment 100 may also include a server computer 114 with a processor 118, that is enabled to run a software program 112, and a data storage device 120. In some embodiments, server computer 114 may be a resource management server, a web server, an IoT device/sensor, or any other electronic device capable of receiving and sending data via the communication network 110. In another embodiment, server computer 114 may represent a server computing system utilizing multiple computers as a server system, such as in a cloud computing environment.

The delivery coordination and meeting scheduling program 108 running on client computer 102 may communicate with the software program 112 running on server computer 114 via the communication network 110. As will be discussed with reference to FIG. 4, client computer 102 and server computer 114 may include internal components and external components. In an embodiment, the server computer 114 may include one or more IoT devices and/or sensors capable of transmitting a data stream to the client computer 102 to be processed by the data delivery coordination and meeting scheduling program 108.

The networked computer environment 100 may include a plurality of client computers 102 and server computers 114, only one of which is shown. The communication network 110 may include various types of communication networks, such as a local area network (LAN), a wide area network (WAN), such as the Internet, the public switched telephone network (PSTN), a cellular or mobile data network (e.g., wireless Internet provided by a third or fourth generation of mobile phone mobile communication), a private branch exchange (PBX), any combination thereof, or any combination of connections and protocols that will support communications between client computer 102 and server computer 114, in accordance with embodiments of the present disclosure. The communication network 110 may include wired, wireless or fiber optic connections. As known by those skilled in the art, the networked computer environment 100 may include additional computing devices, servers or other devices not shown.

Plural instances may be provided for components, operations, or structures described herein as a single instance. Boundaries between various components, operations, and data stores are somewhat arbitrary, and particular operations are illustrated in the context of specific illustrative configurations. Other allocations of functionality are envisioned and may fall within the scope of the present invention. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present invention.

Figure 2:
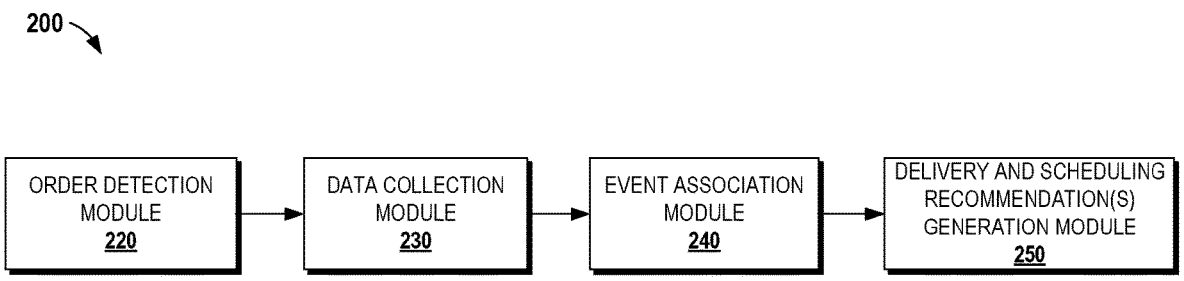
FIG. 2 depicts a computer system for automatically coordinating an order delivery and meeting schedule for a plurality of recipients, according to an embodiment of the present disclosure.

Referring now to FIG. 2, components of a computer system 200 for automatic delivery coordination and meeting scheduling for a plurality of recipients are shown, according to an embodiment of the present disclosure.

In one or more embodiments, the computer system 200 includes an order detection module 220, a data collection module 230, an event association module 240, and a delivery and scheduling recommendation generation module 250.

According to an embodiment, the order detection module 220 can be triggered by one or more actions performed by a user of the delivery coordination and meeting scheduling program 108 (FIG. 1). Non-limiting examples of user's actions that can trigger the order detection module 220 includes: (1) the user, via an e-commerce platform, voice assistant, call center, chatbots, etc., adds items to a shopping cart and proceeds to check out, and (2) the user modifies an order already placed. In some embodiments, the order detection module 220 can be triggered by batch jobs being performed for automatically detecting order delivery updates over a preconfigured time interval.

The data collection module 230, prior users and recipients consent, collects information associated with the user and order recipients from different sources. For example, the data collection module 230 identifies a user profile (e.g., historical tasks/activities performed from enterprise systems or online, and social media interactions), a recipient(s) profile (e.g., demographic information, geographic location, personal preferences, calendars from social media or enterprise HR systems), a knowledge corpus of user's historical orders and recipient's delivery choices (e.g., order date, actual delivery date, etc.), a data catalog from master ERP systems maintaining Stocked Keeping Unit (SKU) definitions (including attributes, images, departments, assortments, etc.), special events (e.g., one-time programs/events, themes, special occasions, holidays, current and/or future recognition initiatives, historical knowledge corpus about user(s) from social media, calendar bookings or enterprise business events systems), and IoT sensors data (to obtain real time view of delivery dates from logistic providers and predict possible delays caused by weather, delivery disruptions, pandemics, natural disasters from various data sources).

It should be noted that data collection (e.g., from calendars, IoT devices, sensors, etc.) is done with user(s) and recipient(s) consent via, for example, an opt-in and opt-out feature. The user(s)/recipient(s) can choose to stop having his/her information being collected or used. In some embodiments, user(s)/recipient(s) can be notified each time data is being collected. The collected data is envisioned to be secured and not shared with anyone without previous consent. User(s)/recipient(s) can stop data collection at any time.

In one or more embodiments, based on the information collected by the data collection module 230, the event association module 230 is capable of determining whether the order includes multiple recipients and whether the order is created in response to a planned or scheduled event that involves the multiple recipients (hereinafter "the plurality of recipients"). For example, in an embodiment, the event can be identified based on the recipients in the order, items in the order, and gift options in the order.

Once the event association module 230 determines that the order is a multi-recipient order and it is associated with the event (i.e., event-driven order), the delivery and scheduling recommendation generation module 250 identifies the cart during checkout as a multi-recipient cart by iterating over individual line items in the order and corresponding delivery addresses. The delivery and scheduling recommendation generation module 250 may further determine: (1) whether the cart includes gift messages, gift wraps or gift-related attributes at an individual line item level to account for language choices and translations, and (2) whether the order has been modified and the modification contains multi-recipients, reference to gift messages, gift wrapping or gift related attributes at an individual line item level.

According to an embodiment, for each (order) recipient identified by the order detection module 220, the computer system 200 retrieves data from the data collection module 230 to generate a correlation pattern between recipient profiles and historical data features including delivery dates, delivery options (e.g., ship-to-home, pickup from a designated location, etc.) and preferred meeting dates, times, and digital platforms (e.g., email, Slack, WebEx, etc.). The computer system 200 takes into account geographically distributed recipients (i.e., different geographic locations), different time zones and delivery times. It should be noted that, if it is determined that the plurality of recipients are in different geographic locations where different language may be spoken or simply a recipient chooses recommendations to be generated in a different language, the computer system 200 is capable of executing the language selection and language translation.

Particularly, the delivery and scheduling recommendation generation module 250 of computer system 200 uses supervised machine learning techniques such as a Linear Regression models to derive a recommendation on the individual line item with a delivery date, delivery options and service level (e.g., regular shipping, rush shipping, next day shipping, etc.) with a holistic view on synchronization of dates at a cart/order level.

In one or more embodiments, the computer system 200 generates recommendations as default values on the drop down for the user placing the order along with multiple options other than those prepopulated by default. For example, the computer system 200 determines that the earliest shared delivery date for a multi-recipient order is March $10^{th}$ in the afternoon. Additionally, the computer system 200 determines that a shared delivery can also be performed on March 11th in the afternoon and March $12^{th}$ in the morning. In this case, the computer system 200 considers March 10th in the afternoon as the best delivery date and prepopulates this option (e.g., generates a recommendation to the user including this option), but also provides an option to the user to change the coordinated delivery date to March $11^{th}$ in the afternoon or March 12th in the morning.

Since the proposed embodiments involve multi-dimensional data factors, in some instances, an initial (predetermined) weight and rank can be assigned to each data factor (e.g., location, delivery speed, relevance of the event, etc.) such that the computer system 200 can determine relationships among data factors through continuous learning. Accordingly, recommendations including delivery and scheduling options are provided based on ranking and weighting algorithms.

The delivery and scheduling recommendation generation module 250 provides recommendations for automatically generating meeting invites to each of the plurality of recipients based on a derived date and time on a determined meeting platform. In some embodiments, the delivery and scheduling recommendation generation module 250 generates an alternate meeting date and/or time to facilitate automatic rescheduling in case of identifying delivery delays.

Based on the derived recommendations, the computer system 200 is capable of updating the order or shopping cart using information derived from the collected data and correlation patterns. The computer system 200 informs each of the plurality of recipients about the order updates using, for example, text messages or a bulk email.

In some embodiments, meetings scheduled by the delivery and scheduling recommendation generation module 250 can be automatically initiated by connecting to an enterprise digital content server (e.g., email server, Slack server, WebEx server, etc.). In such instances, the delivery and scheduling recommendation generation module 250 can block the calendars of each the plurality of recipients for the scheduled date and time.

It should be noted that for each order, the computer system 200 analyses individual order level context for a multi-recipient scenario and determines the existence of an order with similar data characteristics for synchronizing the delivery dates, service levels and meeting date and time. This may facilitate synchronization of delivery options across multiple orders; particularly, when changes to an original order can no longer be made. According to an embodiment, the computer system 200 employs KNN techniques to classify a context of the detected order(s) and apply a synthesis on such order(s) to perform the aforementioned steps.

Figure 3A:
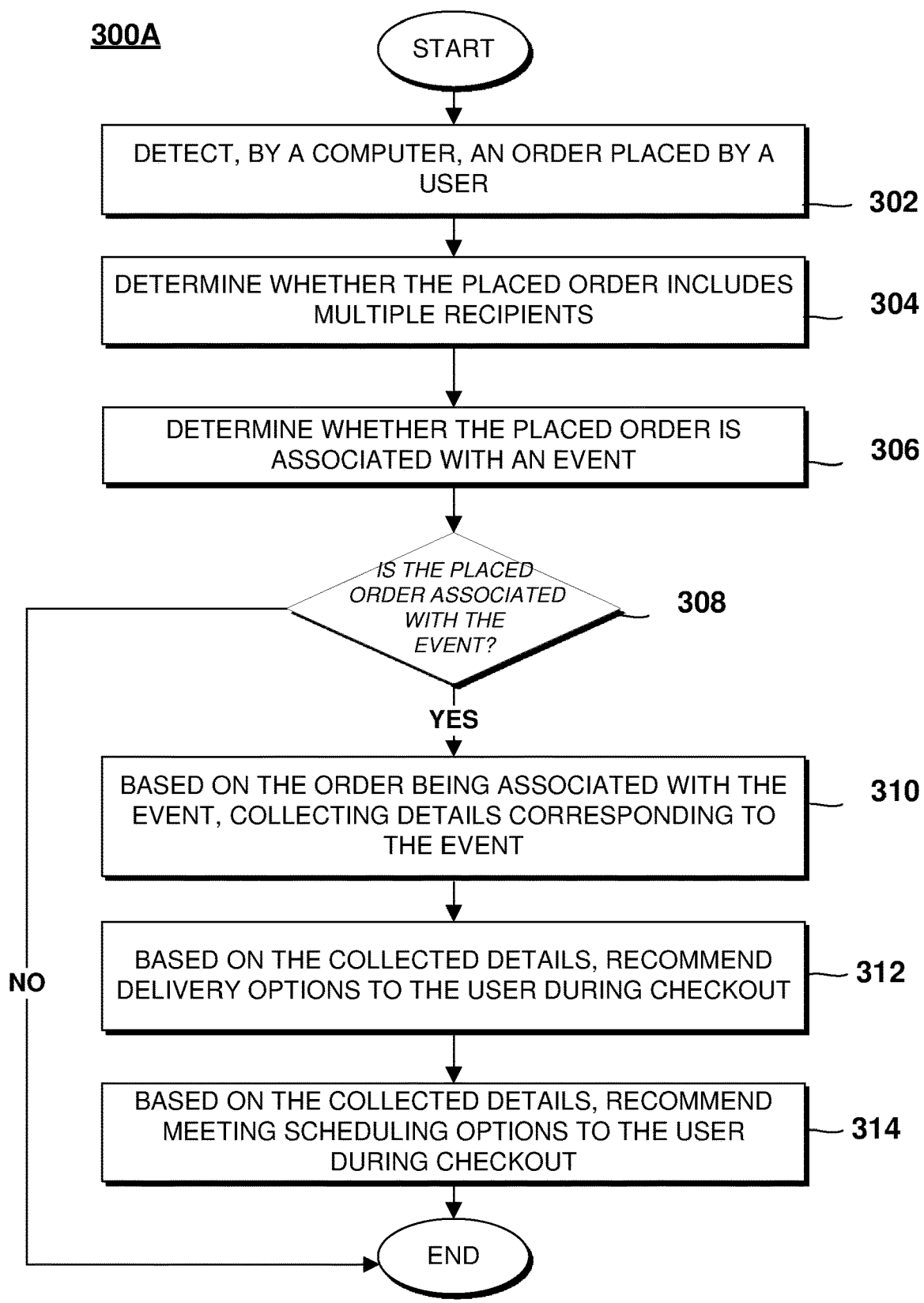
FIG. 3A depicts a flowchart illustrating the steps of a computer-implemented method for automatically coordinating an order delivery and meeting schedule for a plurality of recipients, according to an embodiment of the present disclosure.

Referring now to FIG. 3A, a flowchart 300A illustrating the steps of a computer-implemented method for delivery coordination and meeting scheduling for a plurality of recipients is shown, according to an embodiment of the present disclosure.

The process starts at step 302, in which the computer system 200 (FIG. 2) identifies or detects an online business transaction performed by a user. In this embodiment, the online business transaction involves an order placed by the user. In an exemplary embodiment, the online business transaction including the placed order can be performed using at least one of an e-commerce platform, a voice assistant, a call center, a chatbot, etc. At step 304, it is determined whether the order includes a plurality of recipients (i.e., multiple recipients).

The process continues with step 306, in which, using collected data corresponding to the user and each of the plurality of recipients, it is determined whether the order is associated with an event. Stated differently, at step 306, the computer system 200 (FIG. 2) is capable of recognizing whether the user placed the order in response to a planned or scheduled event involving the plurality of recipients.

At step 308, based on determining that the order is associated with the event, the process continues to step 310, in which details corresponding to the event are collected by the computer system 200 (FIG. 2). Collected details regarding the event include, for example, a type of event, a date and time of the event, number of attendants or participants, type of attendance (in person, virtual, optional, required, etc.), and so on.

At step 312, delivery options are generated and presented to the user during checkout based on the event details collected at step 310. As mentioned above, coordinated or synchronized delivery options are derived based on the collected details of the detected event.

Similarly, at step 314, based on the collected details, meeting scheduling options are generated and presented to each of the plurality of recipients associated with the event during checkout. The generated meeting scheduling options may include a date, a time, a meeting platform (e.g., Slack, WebEx, etc.), a physical address, etc.

For instance, a department within a corporate organization celebrates work anniversary milestones of 5, 10, 15, 20 and 25 years by issuing a certificate of appreciation to each worker. The operations team in the department identifies all the eligible workers on a monthly basis. A member of the operations team places an order including line items, units, and address associated with each eligible worker. In this instance, the previously described embodiments allow the eligible workers to receive the certificates simultaneously (e.g., delivered on identical date and time windows) by automatically deriving and recommending the synchronized delivery date for all the eligible workers based on determined delivery options (e.g., ship-to-home, pickup from a designated location, etc.) and service levels (e.g., regular shipping, rush shipping, next day shipping, etc.). The proposed embodiments allow the operations team to have complete visibility of such recommendations at any time during the order life cycle, i.e., from checkout up to final delivery. The proposed embodiments generate recommendations to the operations team to set-up regular and/or virtual events to celebrate the milestones of workers with leadership, management, additional coworkers, etc.

Figure 3B:
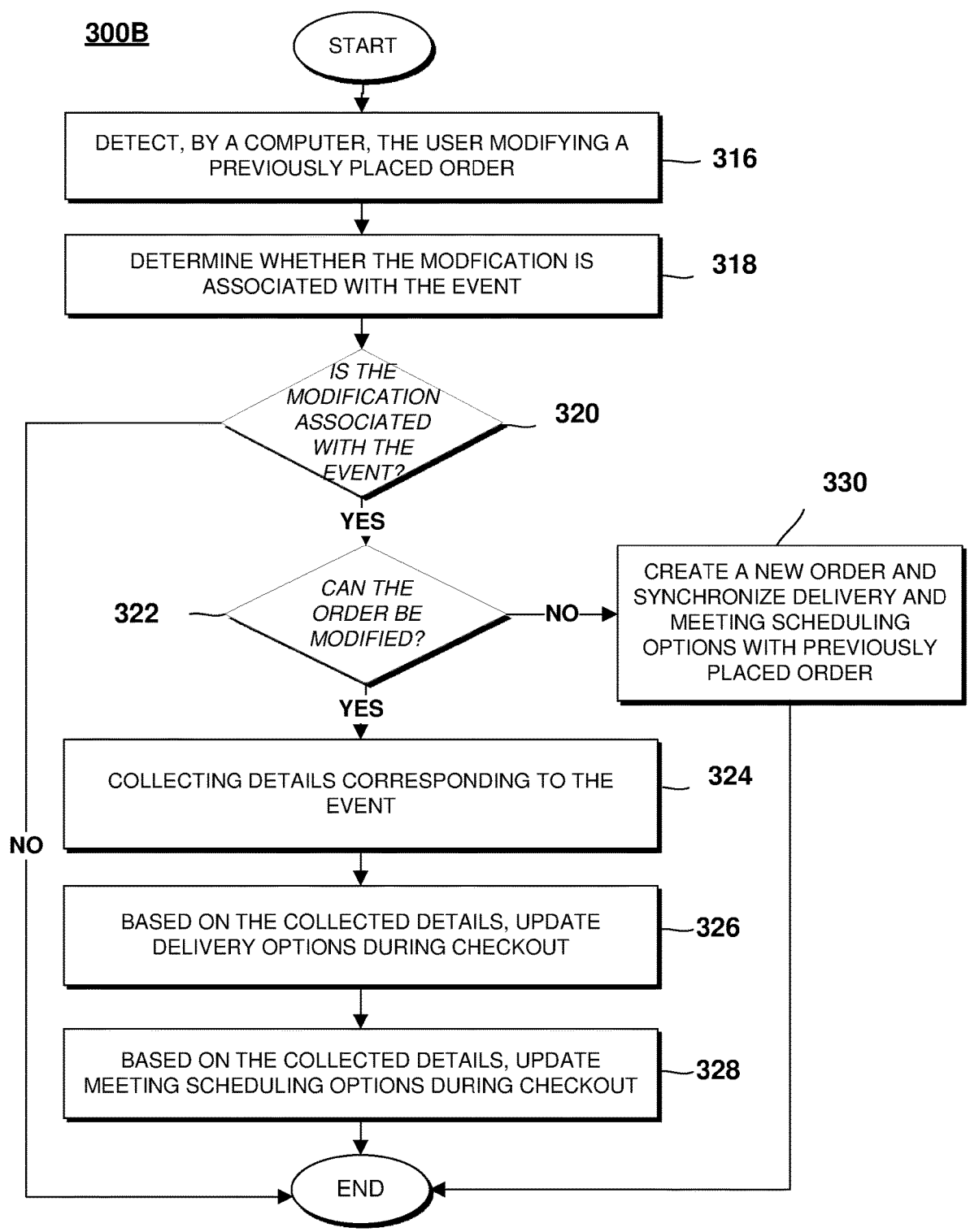
FIG. 3B depicts a flowchart illustrating the steps of a computer-implemented method for automatically detecting order modifications and updating the order delivery and meeting schedule for the plurality of recipients based on the detected order modifications, according to an embodiment of the present disclosure.

Referring now to FIG. 3B, a flowchart 300B illustrating the steps of a computer-implemented method for automatically detecting modifications to a previously placed order and updating the order delivery and meeting scheduling for the plurality of recipients based on the detected order modifications, according to an embodiment of the present disclosure.

The process starts at 316 by detecting the user modifying a previously placed or existing order. At step 318, the computer system 200 (FIG. 2) determines whether the detected modification is associated with the event related to the previously placed order (e.g., the order placed in FIG. 3A).

At step 320, if it is determined that the modification is associated with the event, the process continues with step 322. At step 322, if the order can still be modified, additional details corresponding to the event can be collected at step 324.

Based on the collected additional details, delivery options for the previously placed order can be updated during checkout at step 326.

Similarly, at step 328, meeting scheduling options can be updated for each of the plurality of recipients associated with the event during checkout.

If, at step 322, it is determined that the order cannot be modified, a new order can be generated at step 330 including new delivery and meeting scheduling options. According to an embodiment, the new delivery and meeting scheduling options corresponding to the newly created order can be synchronized with the delivery and meeting scheduling options of the previously placed order.

For example, user A placed a first order O1 for recipients B, C and D with coordinated delivery. After placing the first order, user A realized that recipient E should have been added. First order O1 can no longer be modified, so user A places a second order O2. In such cases, the proposed method recommends delivery options for the second order O2 in a way such that the second order O2 is delivered at the same time as the first order O1 (i.e., simultaneous delivery for recipients B, C, D and E). Further, the proposed method adds recipient E to the meeting scheduled for the initial first order O1.

Thus, the previously described embodiments provide an AI-based system and method to identify a multiple-recipient order as an event driven order, derive coordinated fulfillment options based on collected details of the identified event, and recommend the derived fulfillment options to the user during checkout. The recommendations leverage an AI-based approach coupled with a correlation to users, entities, multiple recipients, actions (e.g., tasks, activities, needs, and choices) in the ecosystem and an automated decision making engine for handling related multi-recipient cases.

Figure 4:
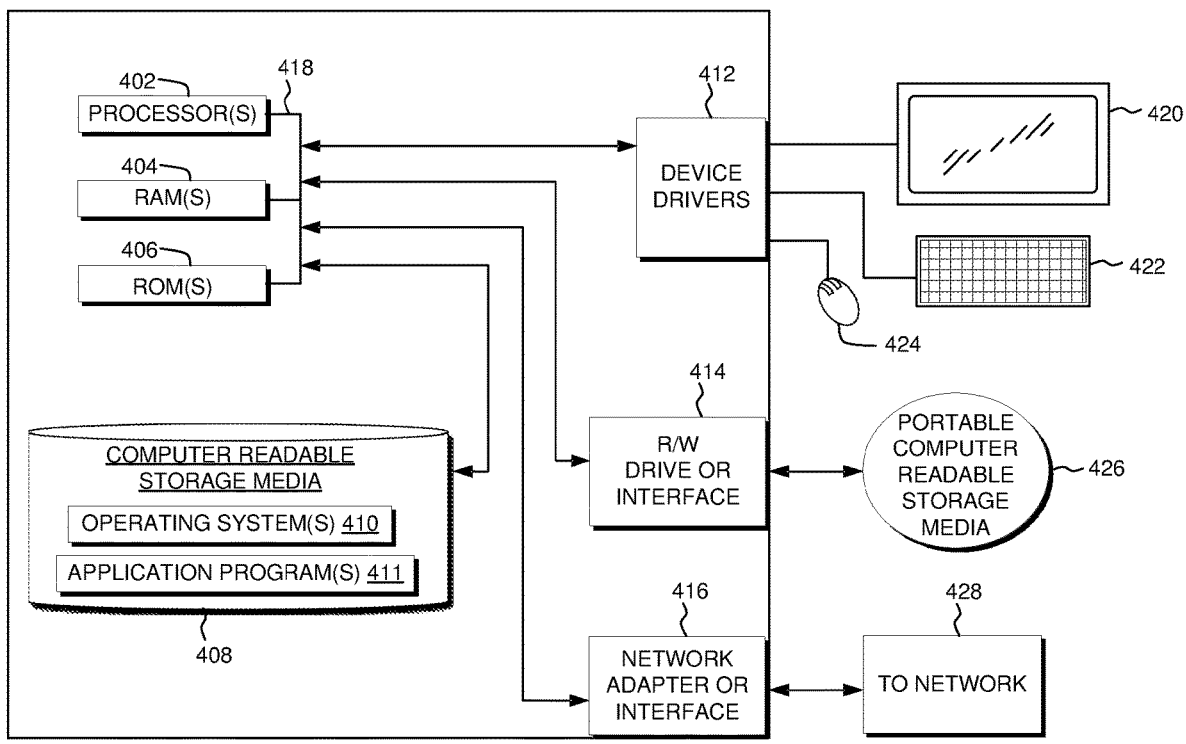
FIG. 4 is a block diagram of internal and external components of a computer system, according to an embodiment of the present disclosure.

Referring now to FIG. 4, a block diagram of components of client computer 102 and server computer 114 of networked computer environment 100 of FIG. 1 is shown, according to an embodiment of the present disclosure. It should be appreciated that FIG. 4 provides only an illustration of one implementation and does not imply any limitations regarding the environments in which different embodiments may be implemented. Many modifications to the depicted environment may be made.

Client computer 102 and server computer 114 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computer 102 and server computer 114 may also include a R/W drive or interface 414 to read from and write to one or more portable computer readable storage media 426. Application programs 411 on client computer 102 and server computer 114 may be stored on one or more of the portable computer readable storage media 426, read via the respective R/W drive or interface 414 and loaded into the respective computer readable storage media 408.

Client computer 102 and server computer 114 may also include a network adapter or interface 416, such as a TCP/IP adapter card or wireless communication adapter (such as a 4G wireless communication adapter using OFDMA technology) for connection to a network 428. Application programs 411 on client computer 102 and server computer 114 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Client computer 102 and server computer 114 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may include hardware and software (stored on computer readable storage media 408 and/or ROM 406).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
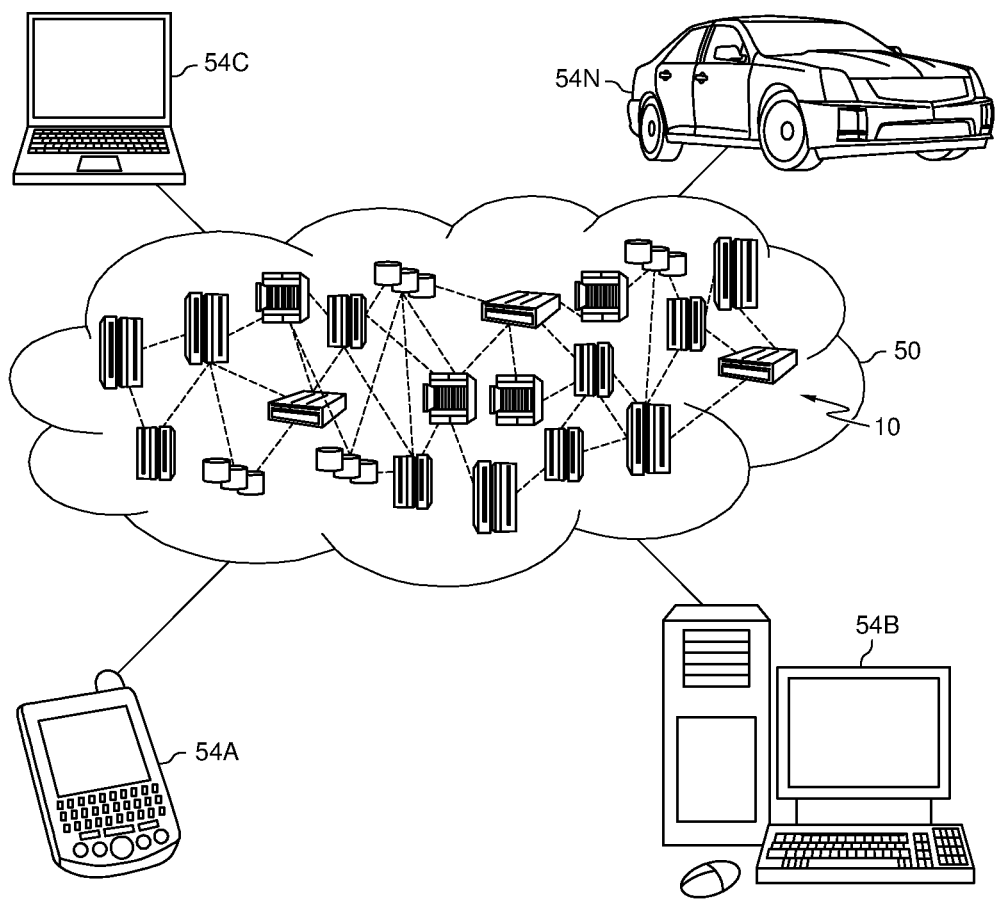
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
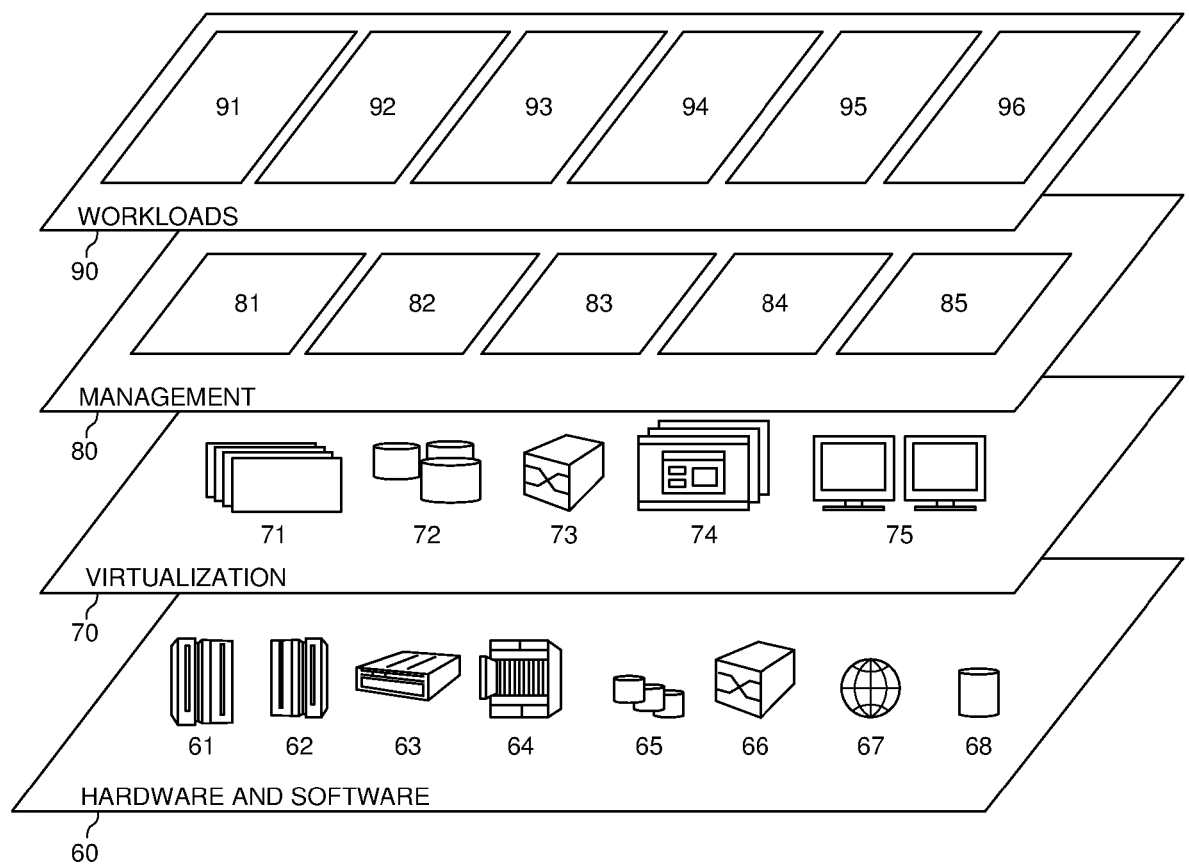
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automatic order delivery coordination and meeting scheduling 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic delivery coordination and meeting scheduling, comprising:
    identifying, by a computer, an online business transaction performed by a user, the online business transaction including an order placed by the user, wherein the order includes a plurality of recipients;
    generating, by the computer, a correlation pattern between a user profile of each of the plurality of recipients included in the order placed by the user and historical data features associated with the user profile of each of the plurality of recipients;
    training, by the computer, a linear regression model using the generated correlation pattern to derive a recommendation including a synchronized delivery option and a synchronized meeting scheduling option for the plurality of recipients;
    determining, by the computer, whether the order is associated with an event, the event including the plurality of recipients;
    in response to the order being associated with the event, collecting, by the computer, information corresponding to the event;
    based on the collected information corresponding to the event and the trained linear regression model, generating, by the computer, a first recommendation during checkout including the synchronized delivery option for the plurality of recipients;

based on the collected information corresponding to the event and the trained linear regression model, generating, by the computer, a second recommendation during the checkout including the synchronized meeting scheduling option for the plurality of recipients;

detecting, by the computer, the user modifying the placed order;

determining, by the computer, whether the modification is associated with the event;

based on the modification being associated with the event, collecting additional details associated with the event;

based on the collected additional details, updating, by the computer, the first recommendation; and based on the collected additional details, updating, by the computer, the second recommendation.

2. The computer-implemented method of claim 1, wherein detecting the order being placed by the user comprises identifying at least one of the user adding items to a shopping cart, the user checking out, the user modifying a previously placed order, and a batch job being performed for automatically detecting a delivery updated over a preconfigured time interval.

3. The computer-implemented method of claim 2, wherein the user places the order using at least one of an e-commerce platform, a voice assistant, a call center, and a chatbot.

4. The computer-implemented method of claim 1, wherein determining whether the order is associated with the event comprises:
   identifying the plurality of recipients in the order;
   identifying items in the order; and
   identifying gift options in the order.

5. The computer-implemented method of claim 1, wherein generating the first recommendation further comprises:
   based on the collected information, deriving and presenting the synchronized delivery option to the user during checkout.

6. The computer-implemented method of claim 1, wherein the historical data features associated with the user profile of each of the plurality of recipients are selected from the group consisting of preferred delivery dates, preferred delivery options, preferred meeting dates and times, and preferred digital platforms for the synchronized meeting scheduling option.

7. The computer-implemented method of claim 1, wherein generating the second recommendation further comprises:
   based on the collected information, deriving and presenting the synchronized meeting scheduling option to the user during checkout, the meeting scheduling option including a meeting time and a meeting platform.

8. A computer system for delivery coordination and meeting scheduling, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is configured to perform a method comprising:
   identifying an online business transaction performed by a user, the online business transaction including an order placed by the user, wherein the order includes a plurality of recipients;

generating a correlation pattern between a user profile of each of the plurality of recipients included in the order placed by the user and historical data features associated with the user profile of each of the plurality of recipients;

training a linear regression model using the generated correlation pattern to derive a recommendation including a synchronized delivery option and a synchronized meeting scheduling option for the plurality of recipients;

determining whether the order is associated with an event, the event including the plurality of recipients;

in response to the order being associated with the event, collecting information corresponding to the event;

based on the collected information corresponding to the event and the trained linear regression model, generating a first recommendation during checkout including the synchronized delivery option for the plurality of recipients;

based on the collected information corresponding to the event and the trained linear regression model, generating a second recommendation during the checkout including the synchronized meeting scheduling option for the plurality of recipients;

detecting the user modifying the order;

determining whether the modification is associated with the event;

based on the modification being associated with the event, collecting additional details associated with the event;

based on the collected additional details, updating the first recommendation; and based on the collected additional details, updating the second recommendation.

9. The computer system of claim 8, wherein detecting the order being placed by the user comprises: identifying at least one of the user adding items to a shopping cart, the user checking out, the user modifying a previously placed order, and a batch job being performed for automatically detecting a delivery updated over a preconfigured time interval.

10. The computer system of claim 9, wherein the user places the order using at least one of an e-commerce platform, a voice assistant, a call center, and a chatbot.

11. The computer system of claim 8, wherein determining whether the order is associated with the event comprises:
    identifying the plurality of recipients in the order;
    identifying items in the order; and
    identifying gift options in the order.

12. The computer system of claim 8, wherein generating the first recommendation further comprises:
    based on the collected information, deriving and presenting the synchronized delivery option to the user during checkout.

13. The computer system of claim 8, wherein the historical data features associated with the user profile of each of the plurality of recipients are selected from the group consisting of preferred delivery dates, preferred delivery options, preferred meeting dates and times, and preferred digital platforms for the synchronized meeting scheduling option.

14. The computer system of claim 8, wherein generating the second recommendation further comprises:
    based on the collected information, deriving and presenting the synchronized meeting scheduling option to the user during checkout, the meeting scheduling option including a meeting time and a meeting platform.

15. A computer program product for delivery coordination and meeting scheduling, comprising:
- one or more computer readable storage media, and program instructions collectively stored on the one or more computer readable storage media, the program instructions comprising:
- program instructions to, upon execution by a computer, cause the computer to identify an online business transaction performed by a user, the online business transaction including an order placed by the user, wherein the order includes a plurality of recipients;
- program instructions to, upon execution by the computer, cause the computer to generate a correlation pattern between a user profile of each of the plurality of recipients included in the order placed by the user and historical data features associated with the user profile of each of the plurality of recipients;
- program instructions to, upon execution by the computer, cause the computer to train a linear regression model using the generated correlation pattern to derive a recommendation including a synchronized delivery option and a synchronized meeting scheduling option for the plurality of recipients;
- program instructions to, upon execution by the computer, cause the computer to determine whether the order is associated with an event, the event including the plurality of recipients;
- in response to the order being associated with the event, program instructions to, upon execution by the computer, cause the computer to collect information corresponding to the event;
- based on the collected information corresponding to the event and the trained linear regression model, program instructions to, upon execution by the computer, cause the computer to generate a first recommendation during checkout including the synchronized delivery option for the plurality of recipients;
- based on the collected information corresponding to the event and the trained linear regression model, program instructions to, upon execution by the computer, cause the computer to generate a second recommendation during the checkout including the synchronized meeting scheduling option for the plurality of recipients;
- program instructions to, upon execution by the computer, cause the computer to detect the user modifying the order;
- program instructions to, upon execution by the computer, cause the computer to determine whether the modification is associated with the event;
- based on the modification being associated with the event, program instructions to, upon execution by the computer, cause the computer to collect additional details associated with the event;
- based on the collected additional details, program instructions to, upon execution by the computer, cause the computer to update the first recommendation; and
- based on the collected additional details, program instructions to, upon execution by the computer, cause the computer to update the second recommendation.

16. The computer program product of claim 15, wherein the historical data features associated with the user profile of each of the plurality of recipients are selected from the group consisting of preferred delivery dates, preferred delivery options, preferred meeting dates and times, and preferred digital platforms for the synchronized meeting scheduling option, and wherein the program instructions to generate the first recommendation further comprise:
- based on the collected information, program instructions to derive and present the synchronized delivery option to the user during the checkout.

17. The computer program product of claim 15, wherein the program instructions to generate the second recommendation further comprise:
- based on the collected information, program instructions to derive and present the synchronized meeting scheduling option to the user during the checkout, the meeting scheduling option including a meeting time and a meeting platform.

\* \* \* \* \*